Figure 1:
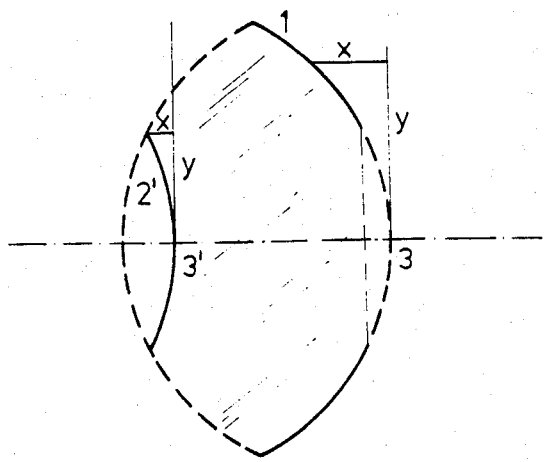

United States Patent [19]

Greguss

[11] Patent Number: 4,566,763
[45] Date of Patent: Jan. 28, 1986

[54] PANORAMIC IMAGING BLOCK FOR THREE-DIMENSIONAL SPACE

[75] Inventor: Pál Greguss, Budapest, Hungary

[73] Assignee: Budapesti Muszaki Egyetem, Budapest, Hungary

[21] Appl. No.: 574,902

[22] Filed: Jan. 30, 1984

[30] Foreign Application Priority Data

Feb. 8, 1983 [HU] Hungary .................. 434/83

[51] Int. Cl.[4] .............. G02B 13/06; G02B 17/00
[52] U.S. Cl. ........................ 350/441; 350/443; 350/444
[58] Field of Search ............ 350/441, 442–444, 350/446

[56] References Cited

U.S. PATENT DOCUMENTS 2,638,033  5/1953  Buchele et al. ............... 350/441
3,505,465  4/1970  Rees ............................. 350/441
3,984,178 10/1976  Bergqvist ...................... 350/441

FOREIGN PATENT DOCUMENTS 1135677  8/1962  Fed. Rep. of Germany ...... 350/441

*Primary Examiner*—John K. Corbin
*Assistant Examiner*—Scott J. Sugarman
*Attorney, Agent, or Firm*—Handal & Morofsky

[57] ABSTRACT

The panoramic imaging block for three-dimensional space being suitable for pictorial recording and displaying of three-dimensional spaces based on the flat cylindrical perspective and having reflecting and refracting surfaces to be described mathematical functions is provided with at least four surfaces influencing the propagation of waves, which are formed as reflective surfaces (1,2) and refractive surfaces (4,5) of equal number, producing an annular image from the approximately cylinder-symmetrical space-part around the concentric-symmetrical axis of the imaging block.

5 Claims, 4 Drawing Figures

PANORAMIC IMAGING BLOCK FOR THREE-DIMENSIONAL SPACE

The invention relates to a panoramic imaging block for three dimensional space able for pictorial recording and displaying of three-dimensional spaces, based on flat cylindrical perspective.

Under pictorial displaying of spaces based on the flat cylindrical perspective a process is meant, in course of which the viewer occupies the centre of the polar-coordinate system describing the view and not the edge (periphery) thereof, i.e. when the image thus obtained is showing the part of the space—which can be considered as cylinder-symmetrical in the first approximation—in a "length" of 360° measured from the horizon and in a width with a spatial angle having been defined by the system. As an example for the display based on the flat cylindrical perspective a sequence of photos shot by the rotation of a periscope can be mentioned, while stationary shooting—including the use of fish-eye lenses—gives an example for peripheric shooting.

The first display system based on the flat cylindrical pespective not requiring the rotation of the picture forming elements or the simultaneous use of several picture-forming systems, i.e. the first display element based on the flat cylindrical perspective, yielding an acceptable picture-quality without the necessity of a rotary motion was the front objective serving for astronomical purposes according the patent GB-PS No. 225.398, which produced an image based on the flat cylindrical prespective with a "legth" of 360° and a width of 150°. The solution according said patent was improved in the German Pat. Nos. 620 538 (published in 1935), 672 393 (published in 1939) and the Hungarian Patent HU-PS No. 193 538 (1954). According to our knowledge, at the time being the so-called "annular camera-lens" in the Space Optics Research Laboratories (USA) can be considered as the most up-to-date three-dimensional space-imaging system based on the flat cylindrical perspective.

The dificiency of the known systems formed of the combination of reflective and refractive surfaces enabling display on basis of the flat cylindrical perspective lies in that either they are too complicated and consequently utmost expensive or there are errors of image forming, generally resulting from the principles of designing, which can be corrected with difficulties only.

The aim of our invention is to eliminate all the disadvantageous features of the known image forming systems and simultaneously to develop a solution which is well suitable for image producing also in acoustic— preferable in the ultrasonic—range, in addition production could be realized with less material expenditure.

The invention is based on the recognition that image forming errors of a panoramic imaging block can be reduced, as well as application in a wider wave-range becomes possible, if in course of forming its aspherical surfaces and determining its shape the fact is considered, whether the velocity of propagation of the wave carrying the signal-sample is higher within the panoramic imaging block or outside thereof, as well as the concessions in respect to image quality allowable in forming an image based on the flat cylindrical perspective in a given case are also considered.

The task set and to be solved by means of the invention was realized by means of a panoramic imaging block being suitable for the pictorical recording and displaying of three-dimensional spaces based on the flat cylindrical perspective, which has reflective and refractive surfaces to be described with mathematical functions. In sense of the invention this solution was developed so, that the panoramic imaging block has at least four surfaces influencing the propagation of waves, which are formed as reflective and refractive surfaces of equal number producing an annular image of the approximately cylinder-symmetrical space-part around the concentric-symmetry axis of the block.

With a possible embodiment of the panoramic imaging block according to the invention the reflective surfaces are aspherical surface which can be described with the mathematic function for instance $x = y^2/4f$. The advantage of this solution lies in that a nearly faultless image forming can be achieved.

With another preferred embodiment the aspherical reflecting and/or refracting surfaces a radius of the "best fit" sphere $$r = 2^3 \sqrt[3]{16 y^4_{max}/k\Delta}$$

With the surfaces thus formed quality of image forming is still acceptable, while the panoramic imaging block can be manufactured considerably easier and cheaper.

In sense of a further preferred embodiment of the invention it is considered as advantageous, if the value of the radius of curvature of the refractive surfaces is equal to the value of the radius of curvature of the opposite lying reflective surfaces.

In sense of a further preferred embodiment it is considered as advantageous, if the refractive surfaces of the image forming block are concave resp.convex in dependence of the circumstances of wave-propagation. In this case the panoramic imaging block can be used in acoustic ranges too.

It is considered as expedient, if the panoramic imaging block is composed of several components being suitable for performing independent tasks. In this case the parts which do not partake in the production of the annular image are removed from the block and can be utilized for other image forming tasks.

Theoretically both the refractive and reflective surfaces of the imaging block can be plain, convex or concave surfaces, that means that e.g. supposing two refractive and two reflective surfaces, the number of the possible shapes of the block, amounts to the number of the iterative variations of the 4. class which can be formed of three elements, i.e. to 81. (However, it is not meant that all the block shapes are suitable for displaying the three-dimensional space on basis of the flat cylindrical perspective).

Figure 3:
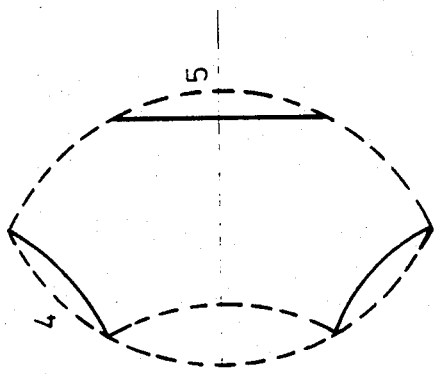
Figure 2:
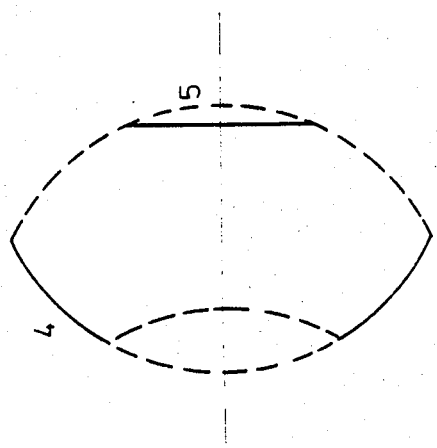
Figure 4:
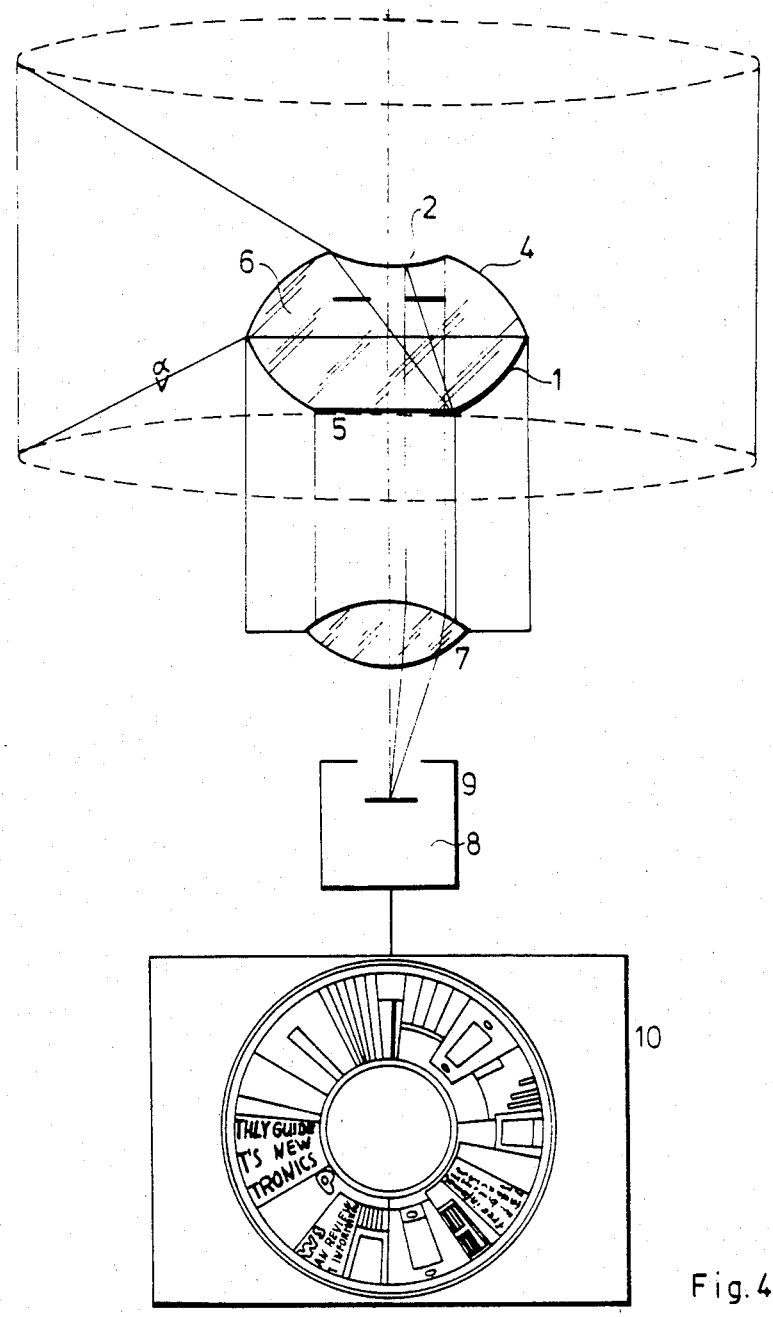

The invention will be described by means of some preferred embodiments of the panoramic imaging block according to the invention, by the aid of the drawings enclosed, wherein:

FIG. 1 interprets the functions describing the aspherical surfaces of a possible embodiment of the invention, FIG. 2 is the sectional view of a further preferred embodiment for the case, when the velocity of propagation of the wave carrying the signal sample is lower within the image forming block, than outside thereof, FIG. 3 is the sectional view of a further preferred embodiment for the case, when velocity of propagation of the wave carrying the signal sample is higher within the image forming block, than outside thereof, FIG. 4 illustrates the panoramic imaging block according to the invention connected to the video-camera and the displayed space shown schematically.

As it is to be seen in FIG. 1, aspherical reflective surfaces 1 and 2 of the imaging block according to the invention can be described by the mathematical function $x=y^2/4f$, wherein x = the distance measured from the base points 3,3' of the surfaces 1,2
y = the distance of the surfacial points measured from the concentric symmetry axis,
f = the focal distance of the aspheric reflective surfaces 1,2.

Taking into consideration that production of the aspheric surfaces to be described with the aforementioned function is utmost expensive in practice and labour-requirement is also high, these surfaces used to be replaced with a surface with a radius of the "best fit" sphere $$r = 2^3 \sqrt[4]{16 y^4_{max}/k\Delta}$$

wherein:

$y_{max}$ stands for the radius of the reflective surface
k is a constant depending on the material of the imaging block, which can be determined experimentally,
$\Delta$ refers to the deviation from the ideal aspheric surface, still allowed by the task of image formation.

When designing the refractive surface 4,5 of the imaging block, one has to start from the fact that is case, if the velocity of propagation of the wave carrying the signal sample is lower in the material of the imaging block, than in its enviroment, refractive surfaces which are not plain, should be convex (FIG. 2), on the other hand, when velocity of propagation of the wave is higher within the block, as it used to be with acoustic (ultrasonic) image formation, concave refractive surfaces are to be formed (FIG. 3).

In case of a given refractory index the reflective surfaces 1,2, the radii of curvature of the refractive surfaces 4 and the mutual distance between them determine the effective focal distance of the imaging block. In the annular image thus obtained—which can be constructed on basis of the known laws of geometric optics—radial lines are yielding straights running parallel with the rotation symmetry axis of the block, while the points lying on the concentric circles are showing the circles lying in the plane perpendicular to the axis.

It follows from the law of reversibility of ray path that by projecting the thus obtained annular image through the panoramic imaging block onto a cylinder jacket, a distorsion-free image will be obtained.

It results from the ray path of the imaging block, that the size of the image having been formed from the space-part around the block must never surpass the unit, which has to be considered, when using the imaging block. Out of the different possibilities of application in FIG. 4 the case is shown, in which the imaging block is connected to a videocamera. The annular image 6 delivered by the imaging block consisting of the reflective surfaces 1,2 and the refractive surfaces 4,5, in a length" of 360° from the horizont and in a width of the determined spatial angle, is projected through the lens 7 onto the target 9 of the videocamera 8 and it is present also on the screen 10 of the monitor.

As the most important advantages of the panoramic imaging block according to the invention it should be mentioned that it can be easily and cheaply produced, due to the complex layout multipurpose application becomes possible as well as in science, as in the industry.

What we claim is:

1. Panoramic imaging block for three-dimensional space based on flat cylindrical perspective, having reflective and refractive surfaces to be described with a mathematical function, said imaging block comprising at least four surfaces for influencing the propagation of waves, said surfaces are formed as reflective surfaces and refractive surfaces of equal number for producing an annular image from the approximately cylinder-symmetrical space-part around the concentric-symmerical axis of the imaging block, wherein said reflective surfaces are aspherical surfaces which can be described with the mathematical function $x=y^2/4f$, wherein:

x = the distance measured from predetermined base points of the reflective surfaces;
   y = the distance of predetermined sursfacial points measured from the concentric axis of symmetry;
   f = the focal distance of the aspheric reflective surfaces.

2. Panoramic imaging block as claimed in claim 1, characterized in that the reflective surfaces and/or refracting surfaces are surfaces with a radius of curvature of the "best fit" sphere, described by $$r = 2^3 \sqrt[4]{16 y_{max}^4 / k\Delta}$$

wherein;
   r = the radius of the "best fit" sphere;
   $y_{max}$ = the radius of the reflective surface;
   k = a constant depending on the material of the imaging block, which can be determined experimentally;
   $\Delta$ = the deviation from the ideal aspheric surface, still allowed by the task of image formation.

3. Panoramic imaging block as claimed in claim 1, characterized in that the value of the radius (r) of curvature of the refractive surfaces (4,5) corresponds to the value of the radius (r) of curvature of the opposite lying reflecting surfaces (1,2).

4. Panoramic imaging block as claimed in claim 1, characterized in that the refractive surfaces (4,5) are convex.

5. Panoramic imaging block as claimed in claim 1, characterized in that the refractive surfaces (4,5) are concave.

* * * * *